(12) United States Patent
Canoy et al.

(10) Patent No.: US 10,075,807 B2
(45) Date of Patent: Sep. 11, 2018

(54) GROUND-BASED LOCATION SYSTEMS AND METHODS

(71) Applicant: QUALCOMM Incorporated, San Diego, CA (US)

(72) Inventors: Michael-David Nakayoshi Canoy, San Diego, CA (US); Stephen Alton Sprigg, Poway, CA (US); Kiet Tuan Chau, San Diego, CA (US); Michael Orlando DeVico, San Diego, CA (US); Yinyin Liu, San Diego, CA (US); Gregory Cisewksi, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/844,111

(22) Filed: Sep. 3, 2015

(65) Prior Publication Data
US 2017/0006417 A1  Jan. 5, 2017

Related U.S. Application Data

(60) Provisional application No. 62/186,834, filed on Jun. 30, 2015.

(51) Int. Cl.
*H04W 4/02* (2018.01)
*H04W 40/24* (2009.01)
(Continued)

(52) U.S. Cl.
CPC ......... *H04W 4/02* (2013.01); *H04B 7/18506* (2013.01); *H04L 63/126* (2013.01);
(Continued)

(58) Field of Classification Search
CPC .......... H04L 9/32; H04W 24/00; H04W 4/023
See application file for complete search history.

(56) References Cited

U.S. PATENT DOCUMENTS

| 7,916,074 B2 | 3/2011 | Mathews et al. |
| 8,370,629 B1 * | 2/2013 | Ngo ...................... H04W 4/021 713/168 |
| 2005/0143092 A1 | 6/2005 | Tamaki et al. |

(Continued)

*Primary Examiner* — Muthuswamy Manoharan
(74) *Attorney, Agent, or Firm* — The Marbury Law Group, PLLC

(57) ABSTRACT

Methods and devices of various embodiments provide enhanced location services by leveraging a system of beacon devices each broadcasting data that is useful in calculating locations and report of the trustworthiness of neighbor beacon devices. Various embodiments include a method performed by a beacon device that may include obtaining location data using a first functionality, evaluating sensor data to identify a breach of trust condition at the beacon device, generating authentication data that indicates any identified breach of trust condition, receiving one or more neighbor beacon broadcast messages using a second functionality, determining whether the one or more neighbor beacon broadcast messages include trustworthy location data, and broadcasting an outgoing broadcast message that includes the obtained location data, timing data, the generated authentication data, and data indicating whether the one or more neighbor beacon broadcast messages include trustworthy location data.

26 Claims, 6 Drawing Sheets

(51) Int. Cl.
      *H04B 7/185*    (2006.01)
      *H04L 29/06*    (2006.01)
      *H04W 12/10*    (2009.01)
      *H04B 17/27*    (2015.01)

(52) U.S. Cl.
      CPC ......... *H04W 12/10* (2013.01); *H04W 40/244* (2013.01); *H04B 17/27* (2015.01)

(56) References Cited

U.S. PATENT DOCUMENTS

| | | | |
|---|---|---|---|
| 2008/0316022 A1* | 12/2008 | Buck | G08B 21/02 340/539.13 |
| 2011/0151898 A1 | 6/2011 | Chandra et al. | |
| 2011/0183626 A1* | 7/2011 | Das | G01S 5/0252 455/67.11 |
| 2011/0299732 A1* | 12/2011 | Jonchery | A63H 27/12 382/103 |
| 2012/0327933 A1* | 12/2012 | Retana | H04L 45/02 370/390 |
| 2013/0223626 A1* | 8/2013 | Edge | H04W 4/06 380/270 |
| 2013/0281110 A1 | 10/2013 | Zelinka et al. | |
| 2014/0087758 A1 | 3/2014 | Maor | |
| 2014/0094136 A1 | 4/2014 | Huang | |
| 2014/0106778 A1 | 4/2014 | Fukuda et al. | |
| 2014/0106782 A1* | 4/2014 | Chitre | H04W 4/22 455/456.2 |
| 2014/0155098 A1 | 6/2014 | Markham et al. | |
| 2014/0171126 A1* | 6/2014 | Mayor | G01S 5/14 455/456.6 |
| 2014/0302869 A1 | 10/2014 | Rosenbaum et al. | |

* cited by examiner

GROUND-BASED LOCATION SYSTEMS AND METHODS

RELATED APPLICATIONS

The present application claims the benefit of priority to U.S. Provisional Application No. 62/186,834, entitled "Ground-Based Location System" filed Jun. 30, 2015, the entire contents of which are hereby incorporated by reference.

BACKGROUND

Global positioning system (GPS) functionalities or receivers are often included within modern electronic devices (i.e., "GPS receiver devices") for identifying location information of the devices at a given time. However, GPS signals that provide data used to determine locations are not always available, such as when a GPS receiver device is in an area with weak or no GPS satellite coverage (i.e., a "GPS dead zone"). GPS assist technologies are typically used to supplement and/or improve location calculations of GPS receiver devices. For example, location data provided by ground-based wireless systems (e.g., directly via base stations or Evolved Node B (eNodeB), indirectly with Wi-Fi® table lookup, etc.) may be aggregated with any GPS signals received. Even with such assistance techniques, limitations in location calculations can be experienced due to signal propagation factors and device deployment density. For example, without the infrastructure to provide needed wide area network (WAN) backhauls, base stations may not be placed in certain geographical areas and thus may not be available to mobile devices for providing assistance data for location calculations. Further, merely adding more of those assistance systems may not be economically practical for patching a dead zone or other area where GPS signals are too weak or non-existent to determine an actual location.

SUMMARY

Various embodiments provide methods, devices, systems, and non-transitory process-readable storage media for providing location data for use by nearby receiver devices. Various embodiments may be performed by a processor of a beacon device within a system of beacon devices to provide location data for use by nearby receiver devices. In some embodiments, a method performed by a processor of a beacon device may include obtaining location data using a first functionality, evaluating sensor data to identify breach of trust conditions at the beacon device, generating authentication data indicating any identified breach of trust conditions, receiving one or more neighbor beacon broadcast messages using a second functionality, determining whether the one or more neighbor beacon broadcast messages include trustworthy location data, and broadcasting an outgoing message that includes the obtained location data, timing data, the generated authentication data, and data indicating whether the one or more neighbor beacon broadcast messages include trustworthy location data.

In some embodiments, obtaining location data using the first functionality may include receiving the location data from one or more of user inputs, a global positioning system (GPS) receiver based on received GPS signals, and incoming messages from neighbor beacon devices. In some embodiments, evaluating sensor data to identify the breach of trust conditions at the beacon device may include evaluating the sensor data to detect a movement of the beacon device, in which the sensor data may be obtained from one or more of a camera sensor, an accelerometer sensor, a gyroscope sensor, and a tamper sensor. In some embodiments, the sensor data may be obtained by the beacon device from at least one sensor coupled to the beacon device. In some embodiments, the generated authentication data may include one or more of tamper state information, a hash, and encrypted data. In some embodiments, obtaining the location data using the first functionality may include using at least one of a GPS receiver, a cellular network connection, and a user input. In some embodiments, the second functionality may utilize two or more messaging protocols, frequencies, formats, standards, or transceivers.

In some embodiments, determining whether the one or more neighbor beacon broadcast messages include trustworthy location data may include determining whether the one or more neighbor beacon broadcast messages include data indicating that the corresponding neighbor beacon devices experienced a breach of trust condition. In some embodiments, a breach of trust condition may include that the corresponding neighbor beacon devices being moved, damaged, and/or hacked. In some embodiments, the method may further include updating an incoming message log based on the one or more neighbor beacon broadcast messages, in which determining whether the one or more neighbor beacon broadcast messages include trustworthy location data may include determining whether the one or more neighbor beacon broadcast messages include trustworthy location data based at least on information within the incoming message log. In some embodiments, determining whether the one or more neighbor beacon broadcast messages include trustworthy location data may include calculating a level of trust for each neighbor beacon device that broadcasted the one or more neighbor beacon broadcast messages, and determining whether the calculated level of trust for each neighbor beacon device that broadcasted the one or more neighbor beacon broadcast messages exceeds a threshold.

Some embodiments may further include appending to the outgoing message a neighbor beacon device identifier and a data segment indicating trustworthiness for each neighbor beacon device that broadcasted the one or more neighbor beacon broadcast messages. Some embodiments may further include adjusting the obtained location data based any of the one or more neighbor beacon broadcast messages that are determined to include trustworthy location data.

Various embodiments include a method performed by a processor of a receiver device to use location data from a system of beacon devices that may include receiving a plurality of broadcast messages from beacon devices, determining whether each of the received plurality of broadcast messages include trustworthy location data, and determining a location based on timing data, location data, and received signal strength indication (RSSI) information associated with the received plurality of broadcast messages that are determined to include trustworthy location data. In some embodiments, the receiver device may be an unmanned autonomous vehicle (UAV), which may be an aerial UAV. In some embodiments, the method may further include comparing at least two broadcast messages from the received plurality of broadcast messages that are from a first beacon device and were received via different functionalities, in which the different functionalities may include two or more messaging protocols, frequencies, formats, standards, or transceivers, and adjusting the determined location based on the comparison of the at least two broadcast messages from the received plurality of broadcast messages that are from the first beacon device. Some embodiments may further include obtaining location data using a positioning system different from the beacon devices, and adjusting the obtained location data based on the determined location.

Further embodiments include receiving devices configured with processor-executable instructions for performing operations of the methods described above. Further embodiments include a non-transitory processor-readable medium on which is stored processor-executable instructions configured to cause a computing device to perform operations of the methods described above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
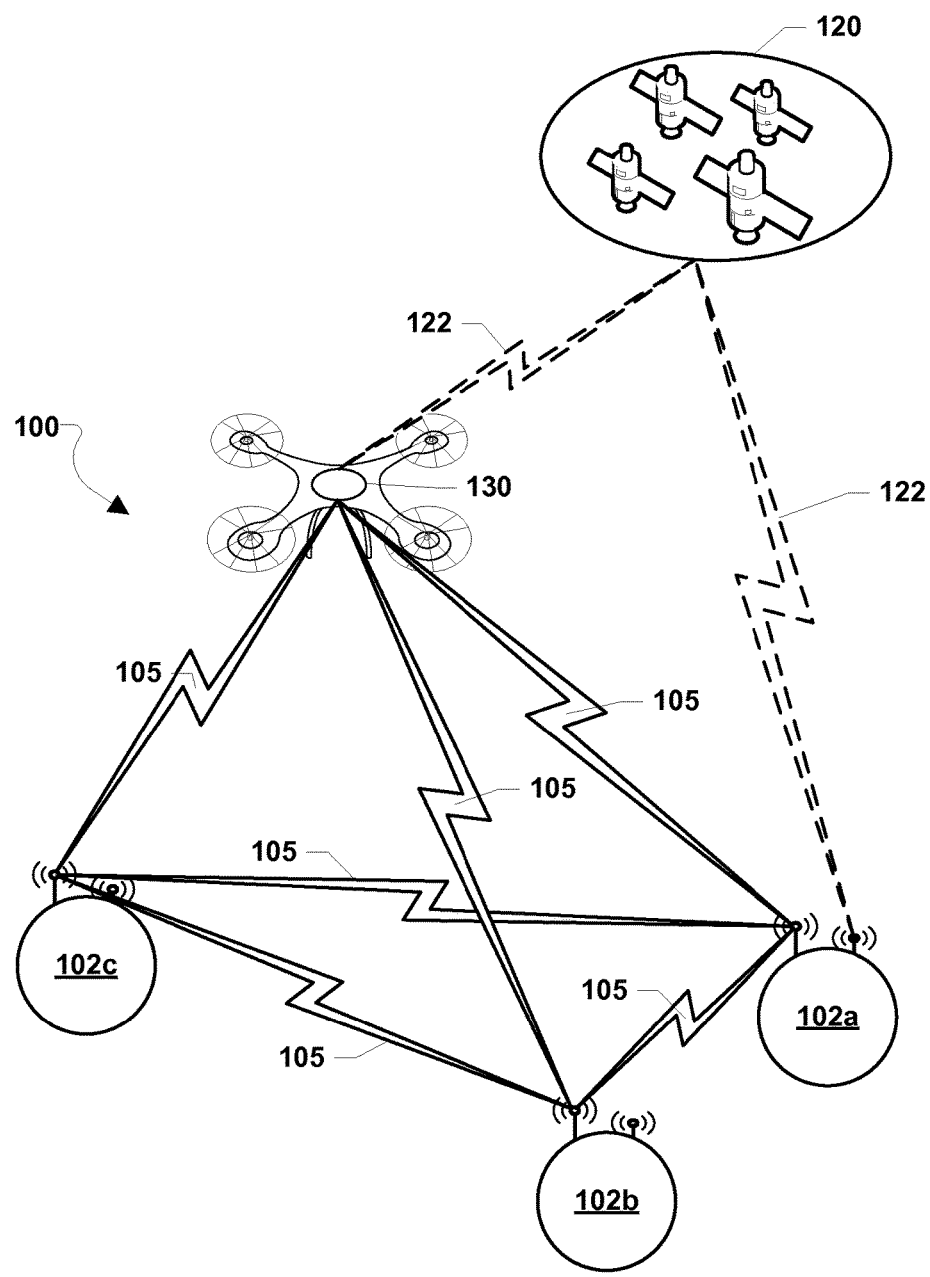
FIG. 1 is a component block diagram of a communication system including a plurality of beacon devices suitable for use in various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to an electronic device equipped with at least a processor. Examples of computing devices may include mobile devices (e.g., cellular telephones, wearable devices, smartphones, web-pads, tablet computers, Internet enabled cellular telephones, Wi-Fi® enabled electronic devices, personal data assistants (PDA's), laptop computers, etc.), personal computers, and server computing devices. In various embodiments, computing devices may be configured with memory or storage as well as networking capabilities, such as network transceiver(s) and antenna(s) configured to establish a wide area network (WAN) connection (e.g., a cellular network connection, etc.) and/or a local area network (LAN) connection (e.g., a wired/wireless connection to the Internet via a Wi-Fi® router, etc.).

The term "beacon device" is used herein to refer to a computing device that is configured to broadcast wireless messages that include various data segments that are usable by receiver devices for determining the location of the receiver devices. Beacon devices may include GPS functionalities (e.g., a GPS receiver/antenna) as well as various other communication functionalities for exchanging wireless messages using one or more messaging protocols, mediums, frequencies, formats, transceivers, and/or standards (e.g., Wi-Fi®, Bluetooth®, etc.). Example components of a beacon device are described with reference to FIG. 2.

The term "receiver device" is used herein to refer to a computing device that is configured to at least receive broadcast messages from beacon devices and process such data (perhaps in combination with other location data sources, such as GPS signals) to compute a location of the receiver device. For example, mobile computing devices (e.g., smartphones), robots, and autonomous vehicles or the like may include, may be coupled to, or may themselves be receiver devices. In some embodiments, beacon devices may also be considered receiver devices when configured to receive broadcast messages and calculate location-relevant data.

The term "unmanned autonomous vehicle" or "UAV" is used herein to refer to an exemplary type of receiver device. A UAV may be an aerial vehicle (aerial UAV) that is capable of flying without any human interaction (i.e., autonomous), with some human interaction (e.g., providing flight instructions to be executed by a processing unit), under partial human control, and/or under full human control (e.g., during take-off and landings.) For example, aerial UAVs may include aerial drones of various design types capable of executing vertical lift-offs, such as helicopter-type drones configured with any number of rotors (e.g., quad-copter drones having four rotors, etc.). However, various embodiments and the claims are not intended to be limited to aerial vehicles, and various forms of unmanned (or manned) autonomous vehicles may perform operations as receiver devices according to various embodiments described. Thus the term UAV also encompasses ground-based autonomous vehicles (e.g., cars, bikes, trucks, etc.), waterborne autonomous vehicles (e.g., autonomous boats, submarines, etc.), and/or space-based autonomous craft (e.g., satellites, probes, etc.). Merely for ease of reference various embodiments are described with reference to aerial UAVs.

Various embodiments provide methods, beacon devices, systems, and non-transitory process-readable storage media for enhancing location services by leveraging a system of beacon devices. Using different manners of transmitting (e.g., at least on various radio frequency (RF) channels, etc.), each of the beacon devices may broadcast data that can be used by receiver devices in calculating locations (e.g., GPS coordinates and timing data) and determining the trustworthiness of "neighbor" beacon devices. Thus, beacon devices according to various embodiments may be deployed as a low-cost, autonomous ground-based system that may provide alternative or supplemental location services that may enable receiver devices to determine or refine position calculations when few or no GPS satellites are visible (e.g., indoors or in GPS dead zones), as well as to assess the trustworthiness of location data received from nearby beacon devices.

In addition to providing location coordinates, beacon devices may be configured to include data in broadcast messages that indicate when a beacon device has been moved or otherwise tampered with (e.g., tamper state information), and whether other beacon devices within transmission range have been moved. In other words, beacon devices may be configured to report on the integrity of the location data shared by the devices of the system by including information in broadcasts that receiver devices can use to determine whether any beacon devices may be broadcasting inaccurate coordinates. For example, a beacon device may broadcast messages that "tattle" or report information indicating that one or more neighbor beacon devices may have been moved based on changes in location signals and/or sensor data received at the beacon device. Thus, beacon devices according to various embodiments may provide nearby receiver devices (e.g., robots, etc.) with a warning to avoid relying upon coordinates or location-based information (e.g., timing signals) provided by neighbor beacon devices that may have been moved, tampered with, or otherwise corrupted.

In various embodiments, a plurality of beacon devices may be placed throughout an environment, such as within a building, campus, and/or widespread throughout a geographic area (e.g., city, etc.). Once placed, each beacon device may determine the geographic coordinates of the device using locating systems or methods, such as GPS (e.g., receiving GPS signals with a GPS receiver and calculating global coordinates), signals from other beacon devices (e.g., broadcast messages from other nearby beacon devices), and/or user inputs. For example, location data may be programmed via a user input during deployment (e.g., based on a survey) or self-determined via GPS functionalities (e.g., a GPS receiver) within the beacon device. Initialization of the beacon devices may also include inputting or otherwise receiving an accurate time, such as provided by a signal (e.g., GPS) or user input. After the initial location data is obtained, the beacon devices may operate indefinitely with or without GPS or GPS assist signals. In some embodiments, the beacon devices may be solar powered or powered by some other renewable source of power. In some embodiments, the beacon devices may recalibrate timing in response to detecting or otherwise receiving a signal from GPS, a cellular network (e.g., from an eNodeB), another beacon device, and/or any other trustable source of accurate time.

Once deployed and initialized, a beacon device may begin broadcasting messages ("broadcast messages") using one or more transmission techniques, such as one or more wireless signaling or messaging protocols, mediums, frequencies, formats, standards, and/or transceivers that are different than GPS. Broadcast messages may include the location coordinates of the beacon device (i.e., the beacon device's own location) and information that a receiver device can use to determine the distance between the beacon device and the receiver device, such as an accurate time signal (e.g., GPS-like time data) or a calibrated signal strength. For example, the broadcast messages may identify the global coordinates of the beacon device (which the beacon device may have determined based on signals received from GPS satellites) and GPS-like timing data. Thus, in some embodiments, the beacon device may broadcast location data along with related timing data so that receiver devices learn the coordinates of the beacon device from the broadcast data, unlike data from GPS signals that require looking up orbital positions of GPS satellites in a database.

In various embodiments, broadcast messages may be transmitted (or broadcasted) using multiple messaging protocols, mediums, frequencies, formats, transceivers, and/or standards (e.g., multiple frequencies and/or using different communication protocols). For example, a beacon device may be configured for transmitting broadcast messages using a Wi-Fi® transceiver and another transmitter (e.g., a transmitter in the GPS frequencies). Receiver devices configured with compatible communication functionalities (e.g., transceiver(s)/antenna configured for use with Wi-Fi®, Bluetooth®, various licensed and/or unlicensed spectrum use, etc.) may receive the broadcast messages and use the information in those messages to assist in location calculations.

The broadcast messages may include other useful information, such as data indicating whether the beacon device has been moved or otherwise been tampered with. For example, broadcast messages from a beacon device may include a bit, flag, or other information indicating whether an accelerometer sensor, gyroscope sensor, and/or other tamper sensor was tripped due to large movements or physical disturbances of the beacon device after deployment.

To improve the ability of receiver devices to identify corrupt or otherwise untrustworthy devices and thus determine more accurate locations, the broadcast messages may also include data that provides information about other devices (i.e., neighbor beacon devices). Such neighbor data in broadcast messages may be generated by the beacon device based on analysis of incoming broadcast messages, such as authentication data, tamper data, signal strength, and/or historical data from particular neighbor beacon devices. For example, based on determining that a particular neighbor beacon device has broadcasted different location data (proving that the beacon device has either moved or been tampered with to send inaccurate data) or has only just begun broadcasting data, the beacon device may determine a low "level of trust" for the neighbor beacon device that may be represented in the beacon device's subsequent broadcast messages. The broadcast messages may include the identifiers of nearby neighbor beacon devices. Further, the broadcast messages may include data indicating whether any of the neighbor beacon devices have been moved or tampered with as well as whether any new or unexpected neighbor beacon devices have been observed recently. The presence of such new or unexpected neighbor beacon devices may indicate possible compromised devices that should not be trusted. In some embodiments, the broadcast messages may also include other data received from neighbor beacon devices, such as location and timing data and other state data.

As an illustration, a broadcast message from the beacon device may include (but is not limited to) any or all of the following data: latitude/longitude (lat/lon) data or coordinates (e.g., from GPS signals, user inputs, determined based on location data from neighbor beacon devices, etc.), synchronizing time information, altitude data, tamper state information, a time of day, a hash or other encoded authenticating data, public key and/or identifier (ID) used for authentication purposes, neighbor beacon device identifiers, and neighbor beacon device state information indicating whether messages from the neighbor beacon devices may be trusted for use in location calculations by a receiver device.

To ensure security, entire broadcast messages or data segments within the broadcast messages may be encoded, encrypted, and/or otherwise secured, especially when broadcast using unlicensed spectrum. In particular, broadcast messages may include authentication data, such as a public key, device identifier, encrypted message, time of day, etc., and other data that receiver devices may use to authenticate the beacon device. For example, similar to "Pretty Good Privacy" (PGP) measures, the beacon device may encode data (e.g., lat/lon) using a key, encrypt the key with a public key, and broadcast both for use by receiver devices capable of decrypting using respective private keys. As another example, the beacon device may sign broadcast messages of in-the-clear data (e.g., location data) using hashed or otherwise encoded and/or encrypted data. In this way, location data may be authenticated and spoofed GPS data may be avoided.

In some embodiments, the beacon device may be configured to use data from other beacon devices to bootstrap location data when at least a few beacon devices are able to receive GPS satellite transmissions. For example, when in a GPS dead zone, a beacon device may determine a location and synch up clocks based upon receiving signals from other beacon devices that may have received GPS signals. When receiving broadcast messages from other beacon devices, each beacon device may use included timing and location data (e.g., latitude/longitude info, etc.) from at least three other trustworthy beacon devices to determine an accurate location using trilateration. In this way, only a subset of the beacon devices of the entire system may need to receive GPS satellite signals, as the rest may be capable of self-calibrating based on the broadcast messages from those beacon devices having GPS coverage.

Systems according to various embodiments may be deployed to replace or augment existing GPS or GPS-assist location services without requiring consistent or comprehensive GPS availability or WAN backhauls. For example, beacon devices may not need to communicate with a remote server, access points, or components of networking infrastructures, such as the Internet, cellular networks, or local area Wi-Fi®. Thus, the beacon devices according to various embodiments may be easily placed in various quantities in remote and/or even dangerous locations, such as being placed in emergency areas (e.g., hurricane area, tsunami, nuclear reactor sites, etc.) via airdrops.

Various embodiments differ from various conventional mesh networks for a number of reasons. Beacon devices are not configured to route messages, but instead process neighbor beacon device data in order to transmit reliability information of devices within the similar transmission range. The systems according to various embodiments are not repeater or spoofing systems, as beacon devices implementing methods of the various embodiments are not configured to merely repeat, reroute, or change other devices' messages within a system, but instead are configured to report additional data that indicates the estimated trustworthiness of other devices. For example, instead of merely repeating the lat/lon data of neighbor beacon devices, a beacon device according to various embodiments may be configured to append additional data to broadcast messages that include indicators of how useful the neighbor beacon devices' data may be to a receiver device. Further, the beacon devices according to various embodiments are configured to obtain location data (e.g., GPS coordinates) with one functionality and broadcast messages using other functionalities (e.g., Wi-Fi®) that include the location data. Thus, various embodiments employ different channels of information between obtaining location data and distributing location data for use by receiver devices.

Unlike conventional systems that include static communities of connected devices, the methods of various embodiments provide a dynamically-created community of trusted location data providers, in which each beacon device may share a dynamic relationship with other beacon devices and receiver devices. For example, beacon devices according to various embodiments may continually change assessments of the trustworthiness of neighbor beacon devices based on the location data, tamper data, and/or state information each broadcasts over time. In this way, various embodiments enable dynamic, transient communities of beacon devices that have an understanding of each member's trustworthiness.

Further, beacon devices according to various embodiments may use authentication data within broadcast messages to ensure the integrity of the payload of the messages, as opposed to using securing a communication channel. For example, by broadcasting messages that include data that may be decoded and/or decrypted with private keys held by a receiver device, beacon devices may sign payloads and guarantee reliability of location data included therein. Such methods of various embodiments enable receiver devices to independently verify data from beacon devices, and thus do not require any WAN connection, such as a secure channel to a central server for data resolution purposes.

Unlike some conventional broadcast systems, the methods of various embodiments may enable location calculations by receiver devices (or beacon devices) based on location data, timing data, and received signal strength indication (RSSI) information gathered by receiver devices. For example, whereas a conventional system may utilize RSSI or lat/lon data to calculate location data, a receiver device implementing methods of various embodiments may use the RSSI, lat/long, and timing data (e.g., GPS coordinate and timing data) from a plurality of beacon devices to identify a precise location. This may enable receiver devices to improve the results of trilateration or triangulation calculations.

In the following descriptions, reference may be made to satellite-based location data systems, such as references to various global positioning system (GPS) components, devices, and/or functionalities (e.g., GPS satellites, GPS receivers, etc.). However, any reference to any particular satellite-based location data system, such as GPS, is merely for convenience, and is not intended to limit the claims to any particular satellite-based location data system or related data or services.

FIG. 1 illustrates a communication system 100 that includes a plurality of beacon devices 102*a*-102*c* suitable for use with various embodiments. The beacon devices 102*a*-102*c* may be positioned around an area, such as around a campus or within a building, and/or around a large geographic area, such as throughout a city, state, country, etc. As described herein, each of the beacon devices 102*a*-102*c* may include various communication functionalities for exchanging signals via different messaging protocols, mediums, frequencies, formats, transceivers, and/or standards. In particular, the beacon devices 102*a*-102*c* may include both a GPS receiver (e.g., antenna, module, logic, etc.) configured to receive signals from overhead GPS satellites 120 that provide data adequate for calculating global locations. For example, the first beacon device 102*a* may be positioned in an area (e.g., outside with a clear view of the sky) such that GPS signals 122 from the GPS satellites 120 are able to be received.

Further, the beacon devices 102*a*-102*c* may include one or more wireless communication functionalities, such as a plurality of transceivers (e.g., radios for Bluetooth®, ZigBee®, Wi-Fi®, RF, etc.), light-emitting/signaling elements (e.g., bulbs, LED, etc.), etc. With such wireless communication functionalities, the beacon devices 102a-102c may periodically broadcast messages that include information about the location and states of the beacon devices 102a-102c. For example, the beacon devices 102a-102c may be configured to periodically broadcast stored GPS coordinates indicating a current global position (e.g., lat/lon/altitude), timing data, as well as identification and authentication data. Each of the one or more wireless communication functionalities may be configured to be utilized alone, in sequence, or in various combinations such that each beacon device 102a-102c may exchange wireless signals 105 via multiple mediums that may each have different characteristics, such as signal strength, range, formatting, penetration, etc.

The communication system 100 may also include one or more mobile receiver devices, such as smartphones, ground-based autonomous machines (e.g., robots, cars, etc.), and/or autonomous aircraft. For example, the communication system 100 may include an aerial UAV 130, such as a quadcopter-type drone. A UAV 130 receiver device may be configured with various communication functionalities similar to those included within the beacon devices 102a-102c. In particular, the UAV 130 may be configured with a location data receiver (e.g., GPS receiver) such that when positioned in an area with a view of the GPS satellites 120, GPS signals 122 may be received. The UAV 130 may also be configured with other wireless communication functionalities (e.g., Bluetooth® transceivers, etc.), and thus may be capable of receiving the wireless signals 105 from the beacon devices 102a-102c when within transmission range. For example, the UAV 130 may receive, via a wireless transceiver, a collection of GPS coordinates and timing data from the beacon devices 102a-102c that may be processed to identify a current location of the UAV 130. In some embodiments, when the UAV 130 is receiving GPS signals 122, the UAV 130 may utilize the data from the wireless signals 105 from the beacon devices 102a-102c to refine or supplement location data determined from the GPS signals 122 at the UAV 130. In some embodiments, due to a current position, the state of the GPS receiver, and/or other conditions that may affect the reception of GPS signals from overhead GPS satellites 120, the UAV 130 may occasionally receive no GPS signals 122 and thus may be configured to identify current coordinates exclusively based on the data from the wireless signals 105 from the beacon devices 102a-102c.

Figure 2:
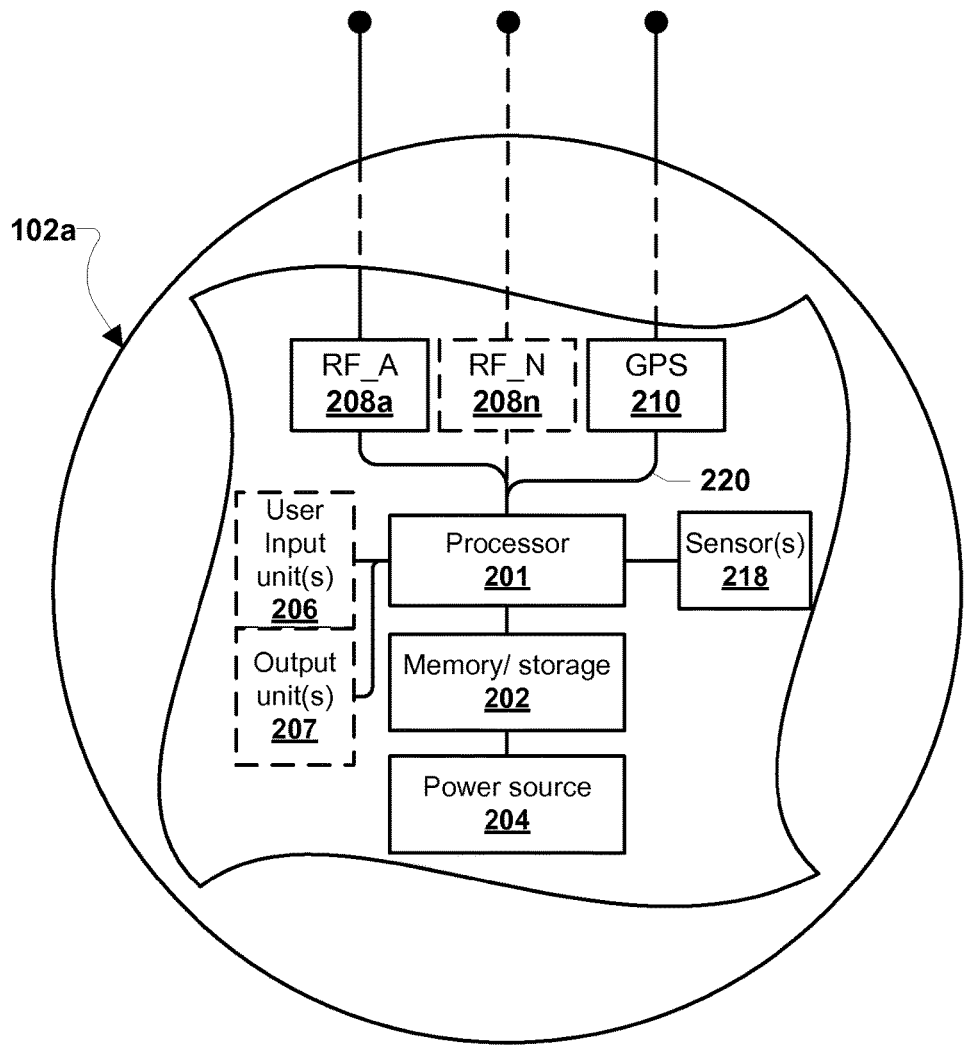
FIG. 2 is a component block diagram of an exemplary beacon device suitable for use with various embodiments.

An example of a beacon device (e.g., 102a-102c) according to various embodiments is illustrated in FIG. 2. With reference to FIGS. 1-2, the beacon device 102a according to various embodiments may include a processor 201 coupled to various other modules or functionalities via a wired or wireless connectivity, such as via a bus 220 or other circuitry. In particular, the processor 201 may be connected to an internal memory 202 and/or other storage, a power source 204 (e.g., a solar panel with connected battery, a rechargeable lithium battery, a power plug capable of interfacing with a conventional power outlet, etc.), various sensors 218 (e.g., a camera sensor, microphone sensor, accelerometer sensor, magnetometer sensor, gyroscope sensor, motion detector, etc.), optional user input unit(s) 206 (e.g., a keyboard/keypad, a control stick, a touchpad, a peripheral device connection interface configured to accept one or more types of connection, such as USB, etc.), and optional output unit(s) 207 (e.g., a light emitting diode (LED) screen, bulb(s), touch screen, a speaker, etc.). In some embodiments, the processor 201 may be one or more multi-core ICs designated for general or specific processing tasks. The internal memory 202 and/or other storage may include volatile and/or non-volatile memory, and may also be secure and/or encrypted memory, or unsecure and/or unencrypted memory, or any combination thereof.

The beacon device 102a may include various wireless communication functionalities connected to the processor 201. For example, the beacon device 102a may include one or more radio signal transceivers and antenna 208a-208n (e.g., Bluetooth®, ZigBee®, Wi-Fi®, RF radio, etc.) for sending and receiving wireless signals. The transceivers and antenna 208a-208n may be used to implement various wireless transmission protocol stacks and interfaces. Additionally, the beacon device 102a may include a GPS functionality 210 (e.g., receiver, antenna, logic, etc.) for receiving information from overhead satellites and calculating location data. It should be appreciated that such a functionality may not be limited to GPS systems, but may include any similar satellite-based location functionality.

Figure 3:
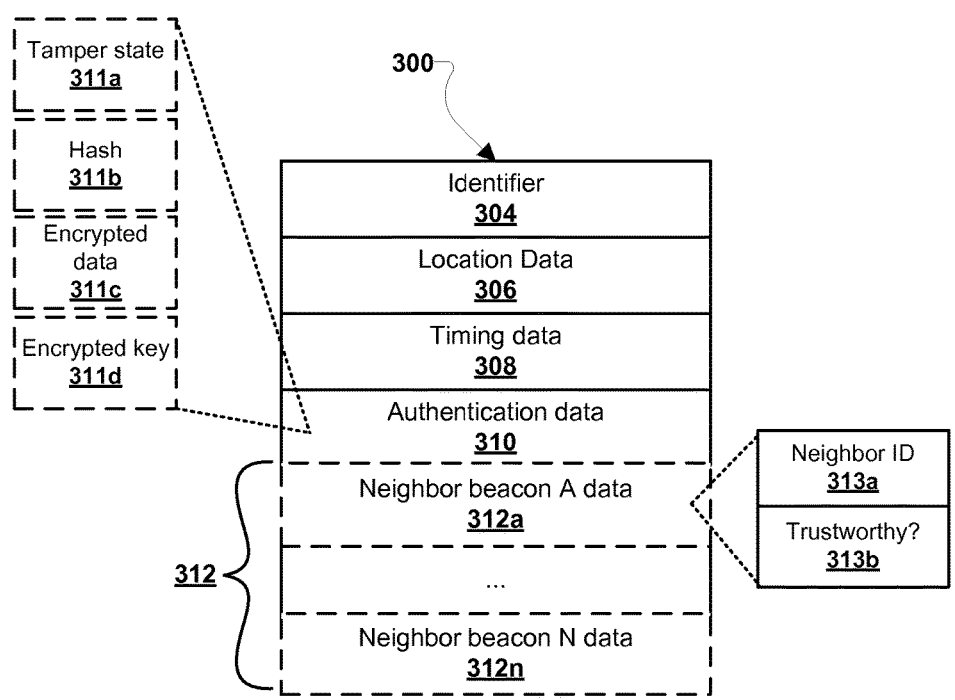
FIG. 3 is a diagram of an example data structure used for messages broadcast by beacon devices according to various embodiments.

FIG. 3 illustrates an example data structure 300 that may be used for wireless broadcast messages transmitted by a beacon device according to various embodiments. With reference to FIGS. 1-3, the data structure 300 may be implemented in a beacon device (e.g., beacon device 102a) for use by other beacon devices (e.g., beacon devices 102b-102c) and/or receiver devices (e.g., UAV 130) as described. The data structure 300 may include an identifier data segment 304 that indicates the identifier (or ID) of the beacon device, a location data segment 306 (e.g., latitude, longitude, altitude data), and a time (or timing) data segment 308 (e.g., timestamp or time of day the message was transmitted). Further, the data structure 300 may include an authentication data segment 310 that may be used to directly authenticate the contents and/or the sender of the message, such as by providing information that may be used by receiver devices to determine a trustworthiness value for the beacon device and/or the included data.

For example, in various embodiments, the authentication data segment 310 may include any of the following information: a tamper state data segment 311a that may be a value, bit, or flag indicating whether the beacon device has been moved away from an original or expected location, and/or a hash data segment 311b that may be used by receiver devices to confirm the identity of the beacon device.

In some embodiments, the authentication data segment 310 may include data that may be needed to implement a Pretty Good Protection/Privacy (PGP) scheme, such as an encrypted data segment 311c that may be generated by encrypting or encoding data (e.g., the identifier data segment 304, location data segment 306, etc.) using a secret key as well as an encrypted key data segment 311d that includes an encrypted version of such a secret key. With the authentication data segment 310, the broadcast message using the data structure 300 may effectively sign the included information so that receiver devices may determine whether there has been a compromise to the beacon device, and thus the included location data should not be trusted for calculations.

Further, the data structure 300 may include a plurality of neighbor data segments 312 related to neighbor beacon devices. Such data segments may provide receiver devices with indirect trustworthiness data of beacon devices (i.e., a beacon message may indicate whether other beacon messages may be trusted). In particular, in response to and based on broadcast messages received from nearby neighbor beacon devices, the beacon device may generate a variable number of neighbor data segments 312a-312n that may be appended to the data structure 300. For example, in response to receiving a first broadcast message including location data from a first neighbor beacon device (e.g., a beacon 'A'), the beacon device may add a first neighbor data segment 312a to a broadcast message, and in response to receiving a second broadcast message including location data from a second neighbor beacon device (e.g., a beacon 'N'), the beacon device may also add a second neighbor data segment 312n to the broadcast message.

In some embodiments, each in the plurality of neighbor data segments 312 may include a neighbor identifier data segment of a neighbor beacon device (i.e., a neighbor beacon device identifier) and a trustworthiness data segment. Such a trustworthiness data segment may be generated by the beacon device that is broadcasting wireless broadcast messages that include the data structure 300. The trustworthiness data segment may be a conclusion or calculation by the beacon device as to whether location data reported by the neighbor beacon device can be trusted by other receiver devices (e.g., a UAV, etc.). For example, the first neighbor data segment 312a may include a neighbor identifier data segment 313a and a trustworthiness data segment 313b that indicates whether the beacon device determined that the neighbor beacon device is trustworthy. In some embodiments, the trustworthiness data segment 313b may indicate a percentage or other symbol that may be associated by receiver devices with a probability of accuracy, freshness, and/or usefulness of location data reported by the neighbor beacon device identified by the neighbor identifier data segment 313a. For example, the trustworthiness data segment 313b may include a bit, value, or other information that a receiver device may interpret to determine whether the location data from that neighbor beacon device should be used to determine a location for the receiver device. In some embodiments, the plurality of neighbor data segments 312 may also each include location data (e.g., lat/lon/altitude, timing data, etc.) as reported by the respective neighbor beacon devices. In some embodiments, the data segments for various neighbor beacon devices may include additional information about the states of the neighbor beacon devices, such as reported sensor data, tamper state, etc.

Figure 4:
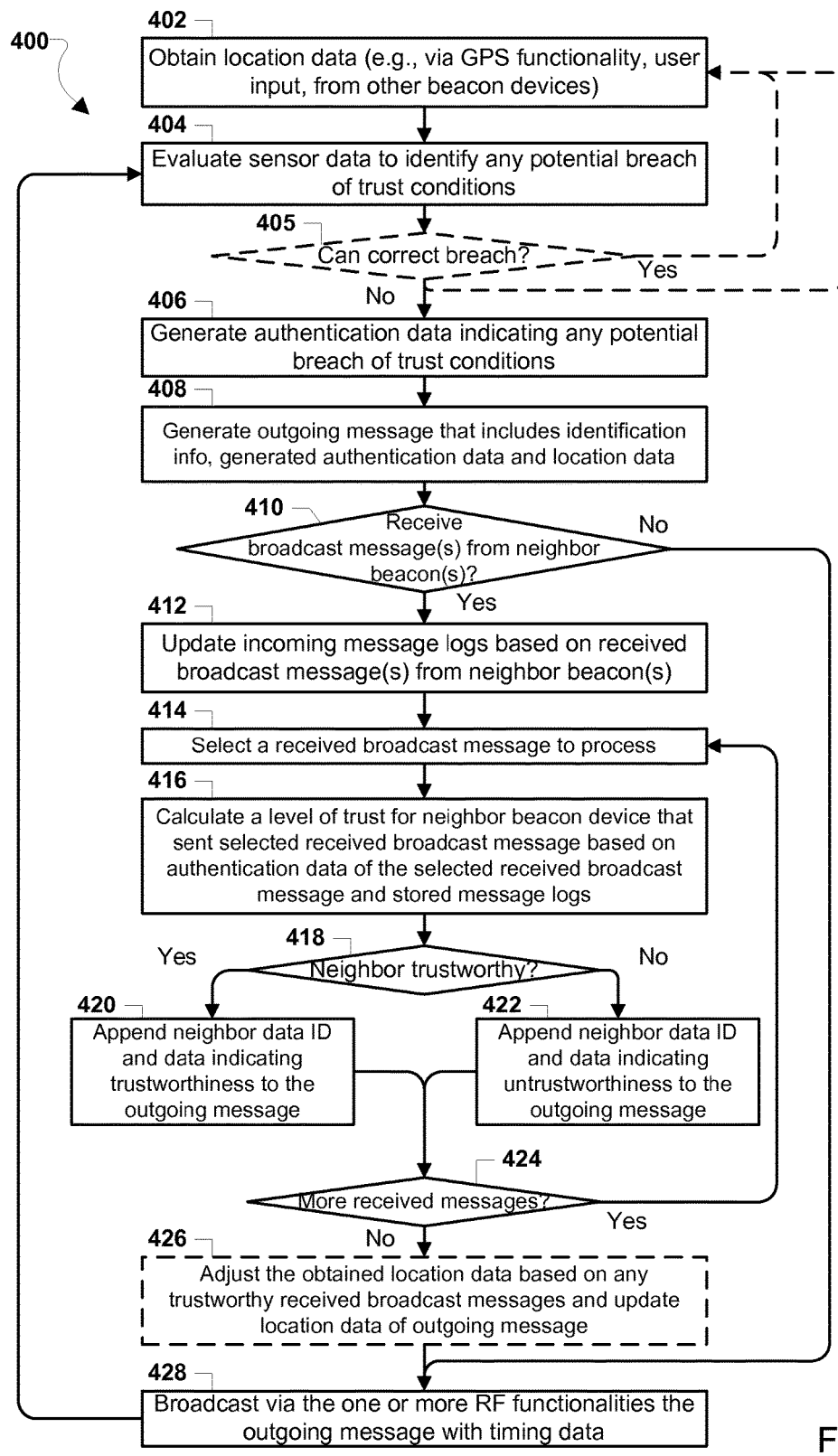
FIG. 4 is a diagram of a method for a beacon device to broadcast location data and neighbor beacon device data for use by nearby receiver devices according to various embodiments.

FIG. 4 illustrates a method 400 for a beacon device to broadcast location data along with neighbor beacon device data for receipt by nearby receiver devices according to various embodiments. With reference to FIGS. 1-4, in order to promote accurate location identification at receiver devices (e.g., UAV 130), the method 400 may include operations for a beacon device (e.g., beacon device 102a) to broadcast messages that indicate the trustworthiness of one or more neighbor beacon devices, thus providing self-policing of various beacon devices within a system. For example, the broadcast messages may indicate that one or more other beacon devices ("neighbor beacon devices") may have been moved, tampered with, or otherwise corrupted such that any receiver device within transmission range should not base location calculations using location data broadcast by these untrustworthy neighbor beacon devices. The operations of the method 400 may be performed by a processor of a beacon device, such as the processor 201.

In block 402, the processor of the beacon device may obtain location data via one or more techniques based on the installation conditions/environment and components/functionalities of the beacon device. For example, when placed in an area with a clear view of the sky, the beacon device may be capable of acquiring current coordinates using a GPS receiver that receives GPS signals from overhead satellites and determining a global position using GPS calculations. As another example, the beacon device may utilize a cellular network connection to receive data from nearby access points (e.g., cellular network towers) and identify location data. As another example, the beacon device may receive user inputs, such as via a touchpad or download from an operator device connected via wired or wireless connection. As another example, the beacon device may determine its location by performing trilateration or triangulation calculations using signals and data received from nearby beacon devices via wireless transmissions (e.g., broadcast messages from other beacon devices). In some embodiments, the beacon device may utilize any combination of the above-mentioned techniques to obtain and adjust the precision or accuracy of the determined location of the beacon device. For example, the beacon device may narrow a range of possible geographic coordinates as provided by a user input based on data subsequently received from GPS satellites or vice versa.

In block 404, the processor of the beacon device may evaluate sensor data to identify any potential "breach of trust" conditions. In general, a "breach of trust" condition may be any change to the functioning, placement, device integrity, and/or environmental conditions that may affect the trustworthiness of the location data stored on and broadcast by the beacon device. In other words, the breach of trust conditions may indicate whether the beacon device has been tampered with, damaged, hacked, or otherwise corrupted so that related data may not be as useful to other devices. In particular, a "breach of trust" condition may occur when the beacon device has been moved from an installation position. For example, when the beacon device was placed in a certain corner of a building, there may be a breach of trust condition when a person moves the beacon device to another corner of the building. As another example, a breach of trust condition may occur when the beacon device falls from an installation location due to being knocked over by a UAV, nefarious device/person, and/or a strong wind.

To identify potential breach of trust conditions, the beacon device may poll various sensors coupled to the beacon device and evaluate retrieved sensor data that may indicate whether the beacon device has been moved and/or is otherwise operating improperly. For example, the beacon device may obtain and analyze accelerometer or gyroscope data to determine whether the beacon device was moved from an original position, thereby making the obtained location data inaccurate. In some embodiments, the beacon device may evaluate sensor data to determine whether any detected movements may be attributed to typical or expected conditions that do not necessarily indicate a breach of trust. For example, the beacon device may evaluate gyroscope data to determine whether perceived movements based on the data may be the result of high winds or a tornado as opposed to a person moving the device. In this way, the beacon device may be configured to differentiate between benign movements and those that may be a cause for security alert.

In some embodiments, the sensor data may be imagery from a camera. For example, the beacon device may be configured to continually or periodically capture images of surroundings and analyze the images to identify changes to the relative positions of static objects or points of reference in the images, thus indicating the beacon device may have been moved. In some embodiments, the beacon device may evaluate sensor data to identify whether the beacon device has been tampered with, such as a tamper sensor configured to indicate when the housing of the beacon device has been manipulated. In some embodiments, the beacon device may also evaluate access logs to the local processes or operating system to identify whether an improper access has occurred, such as unauthorized memory accesses/reads/writes, etc.

that may indicate a nefarious entity has adjusted the location data stored on the beacon device. The above examples of sensors and mechanisms are illustrative and should not be considered limiting, as various other sensors and tamper-resistant devices may be used by the beacon device to provide data that may be analyzed to identify whether the beacon device has encountered a breach of trust condition.

In optional determination block 405, the beacon device may determine whether a breach of trust condition likely exists based on the evaluated sensor data and, if so, whether the beacon device can perform operations to correct such a breach. For example, in response to determining that the beacon device was likely moved based on evaluated gyroscope sensor data or camera sensor data, the beacon device may determine whether new location data can be obtained to correct the now out-of-date and inaccurate location data currently stored on the beacon device. Such a determination may be based on whether the beacon device still has access to the sources of location data used in the operations of block 402. For example, when moved but no longer having access to adequate GPS satellite coverage, the beacon device may determine that a correction is needed but cannot be accomplished at the given time. As another example, in response to determining the beacon device was likely hacked or otherwise corrupted by a nefarious entity, the beacon device may determine that a correction is required but cannot be accomplished by the beacon device alone.

In response to determining that a breach of trust condition exists and can likely be corrected (i.e., optional determination block 405="Yes"), the beacon device may repeat the operations of block 402 to obtain new location data. In this way, the beacon device may perform operations to continue to provide accurate location data in spite of encountering a physical movement.

In response to determining that a breach of trust condition does not exist or in response to determining that a breach of trust condition exists but that cannot be corrected at the given time (i.e., optional determination block 405="No"), the processor of the beacon device may generate authentication data indicating any potential breach of trust conditions in block 406. For example, the beacon device may generate an encrypted token that may be decrypted by receiver devices to confirm the identity, location, and/or general trustworthiness of the beacon device. In some embodiments, sensor data from the beacon device may be used in generating the authentication data. For example, the beacon device may be configured to generate an authentication token using accelerometer data such that when the beacon device has been moved, the beacon device generates a hash or other data segment using the accelerometer data that cannot be resolved by receiver devices, whereas when the beacon device has not been moved, the hash is resolvable by receiver devices. In some embodiments, the beacon device may encode data (e.g., lat/lon) using a key, encrypt the key with a public key, and include both the encoded data and the encrypted key in the authentication data such that receiver devices with the proper private key corresponding to the public key may decrypt and decode the data. In some embodiments, in response to determining that a breach of trust condition exists that cannot be corrected at the given time (i.e., optional determination block 405="No"), the beacon device may avoid broadcasting by returning to the operations of block 402 until the breach of trust condition can be overcome with new, accurate location data. In other words, as the beacon device identifies that the data stored on the beacon device cannot be trusted, the beacon device may voluntarily cease transmitting to avoid propagating the inaccurate data.

In block 408, the processor of the beacon device may generate an outgoing broadcast message that includes identification information (e.g., an ID), the generated authentication data, and the location data. For example, the beacon device may format an outgoing message according to the data structure 300 described herein. Additional data may be appended to the outgoing message with other operations described herein.

In determination block 410, the processor of the beacon device may determine whether one or more broadcast messages are received from neighbor beacon devices. For example, the beacon device may evaluate an incoming message buffer to determine whether any messages also formatted or structured according to the data structure 300 have been received at the beacon device in between broadcasts of the beacon device. In some embodiments, the beacon device may receive broadcast messages via one or more frequency bands, mediums, protocols, and/or functionalities (e.g., radios, antenna, etc.). For example, the beacon device may be configured to simultaneously utilize a plurality of antenna/transceivers to receive different types of RF messages (e.g., Bluetooth®, Wi-Fi®, etc.).

In response to determining that one or more broadcast messages have been received from neighbor beacon devices (i.e., determination block 410="Yes"), the processor of the beacon device may update an incoming message log based on the received broadcast message(s) from neighbor beacon(s) in block 412. For example, the beacon device may update stored data (e.g., a database) to include a data record indicating the time of receipt, identification of the sender neighbor beacon device, location data, and/or state information (e.g., tamper state, etc.) included within each of the received broadcast messages. Such a log may be used for comparisons of location data received via incoming received broadcast messages from the same neighbor beacon devices over time in order to identify changes that may indicate likely untrustworthiness as described herein.

In block 414, the processor of the beacon device may select a received broadcast message to process, such as the next received broadcast message in order of receipt at the beacon device.

In block 416, the processor of the beacon device may calculate a level of trust for the neighbor beacon device that broadcasted the selected received broadcast message based on the authentication data of the selected received broadcast message and the stored message logs. For example, the beacon device may calculate a probability that the neighbor beacon device associated with the selected received broadcast message has not been moved or otherwise corrupted based on the authentication data. The calculation may include decoding and/or decrypting information within the authentication data, such as via an associated private key stored at the beacon device, and evaluating any state information, such as tamper state information included within the authentication data. For example, after performing decoding/decrypting operations with the authentication data of the selected received broadcast message, the beacon device may analyze the resulting data to determine whether the selected received broadcast message corresponds to a format, identity, or measurement that is known and typically considered trustworthy to beacon devices. In some embodiments, the beacon device may compare the location of the selected received broadcast message to any previously received location data from the same neighbor device. For example, the beacon device may perform a lookup on the stored log data using the identifier (ID) of the neighbor beacon device to retrieve one or more previously reported locations for the neighbor beacon device. The beacon device may compare the retrieved one or more previously reported locations to the location data of the selected received broadcast message to determine whether there have been any changes over time that may indicate movement or other manipulation that diminishes the trustworthiness of the data.

In some embodiments, the beacon device may compare the location data reported by the selected received broadcast message to the obtained location data (as obtained via the operations of block 402) to determine the trustworthiness of the data in the selected received broadcast message. For example, based on typical transmission range of the communication medium used to broadcast the selected received broadcast message and an assumed accurate location data of the beacon device itself, the beacon device may determine whether the location data in the selected received broadcast message is possible (i.e., if the received location data is not within the transmission range, then the received location data is likely corrupted or out-of-date).

In some embodiments, neighbor beacon devices may be configured to broadcast redundant broadcast messages using different communication functionalities (e.g., mediums, frequencies, standards, protocols, transceivers, etc.). In such cases, the beacon device may compare data associated with received broadcast messages from the same neighbor beacon device when calculating a level of trust for the neighbor beacon device. For example, the beacon device may evaluate timing data within various broadcast messages received from a particular neighbor beacon device in addition to the included location data in order to determine whether the received broadcast messages (and the receipt of the broadcast messages) are consistent. In some embodiments, the beacon device may determine that a neighbor beacon device is more or less trustworthy based on the number of previously received broadcast messages from that neighbor beacon device. For example, when a neighbor beacon device is first encountered, the beacon device may weigh a trustworthiness factor with less emphasis until subsequent broadcast messages are also received from the same neighbor beacon device that include consistent location data.

In determination block 418, the processor of the beacon device may determine whether the neighbor beacon device that broadcasted the selected received broadcast message (or the location data therein) is trustworthy based on the calculated level of trust for the neighbor beacon device. In other words, the beacon device may determine whether the received location data from the selected received broadcast message is trustworthy location data. For example, the beacon device may compare the calculated trust level to a trust threshold such that the neighbor beacon device may be considered trustworthy when the calculated level of trust exceeds the minimum value for a trustworthy neighbor beacon device.

In response to determining that the neighbor beacon device that broadcasted the selected received broadcast message is trustworthy (i.e., determination block 418="Yes"), the processor of the beacon device may append data to the outgoing message that indicates the identity and trustworthiness of the neighbor beacon device that broadcasted the selected received broadcast message in block 420. For example, the beacon device may set a bit, flag or other data that may be read by a receiver device and may indicate that any location data received within broadcast messages from the neighbor beacon device may be trusted by the receiver device for use in location calculations.

In response to determining that the neighbor beacon device that broadcasted the selected received broadcast message is not trustworthy (i.e., determination block 418="No"), the processor of the beacon device may append data to the outgoing message that indicates the identity and untrustworthiness of the neighbor beacon device that broadcasted the selected received broadcast message in block 422. In this way, any receiver device within reception range of the outgoing message from the beacon device may be informed that location data (and other information) from the neighbor beacon device should not be trusted for determining the receiver device's location. For example, such appended neighbor data may correspond to the neighbor data segments 313a-313b.

In response to performing the operations of block 420 or block 422, the processor of the beacon device may determine whether there are more received broadcast messages to process in determination block 424. In response to determining that there are more received broadcast messages to process (i.e., determination block 424="Yes"), the beacon device may continue with the operations in block 414 for selecting a next received broadcast message to process. In response to determining that there are no more received broadcast messages to process (i.e., determination block 424="No"), the processor of the beacon device may adjust the obtained location data for the beacon device based on any trustworthy received broadcast messages and update the location data of the outgoing message in optional block 426. For example, the beacon device may adjust/refine the obtained location data based on receiving a plurality (e.g., three or more) broadcast messages from neighbor beacon devices, such as by performing trilateration calculations using reported coordinates within the received broadcast messages and/or RSSI data associated with the received broadcast messages.

In response to determining that no broadcast messages have been received from neighbor beacon devices (i.e., determination block 410="No"), or in response to performing the operations of optional block 426, the processor of the beacon device may broadcast, via the one or more RF functionalities, the outgoing message with timing data in block 428. For example, the beacon device may sequentially broadcast the outgoing message on different frequencies and/or using different protocols (e.g., Bluetooth®, Wi-Fi®, etc.). The beacon device may append timing (or time) information indicating the time the outgoing message is broadcasted by the beacon device. Such timing data may be used by receiver devices to perform measurements when calculating location based at least in part on the outgoing message from the beacon device. The beacon device may then continue with the evaluation operations in block 404.

In some embodiments, the beacon device may utilize different RF functionalities (e.g., antenna, transceivers, protocols, etc.) in order to enable different ranging estimates to be calculated by receiver devices. For example, a receiver device may use different radios to receive multiple broadcast messages from the beacon device. The receiver device may identify different propagation effects of the different received signals in order to obtain an estimate of an environment. In other words, a receiver device may define or map a topology based on delays of multiple broadcast messages broadcasted by the beacon device using different RF functionalities.

Figure 5:
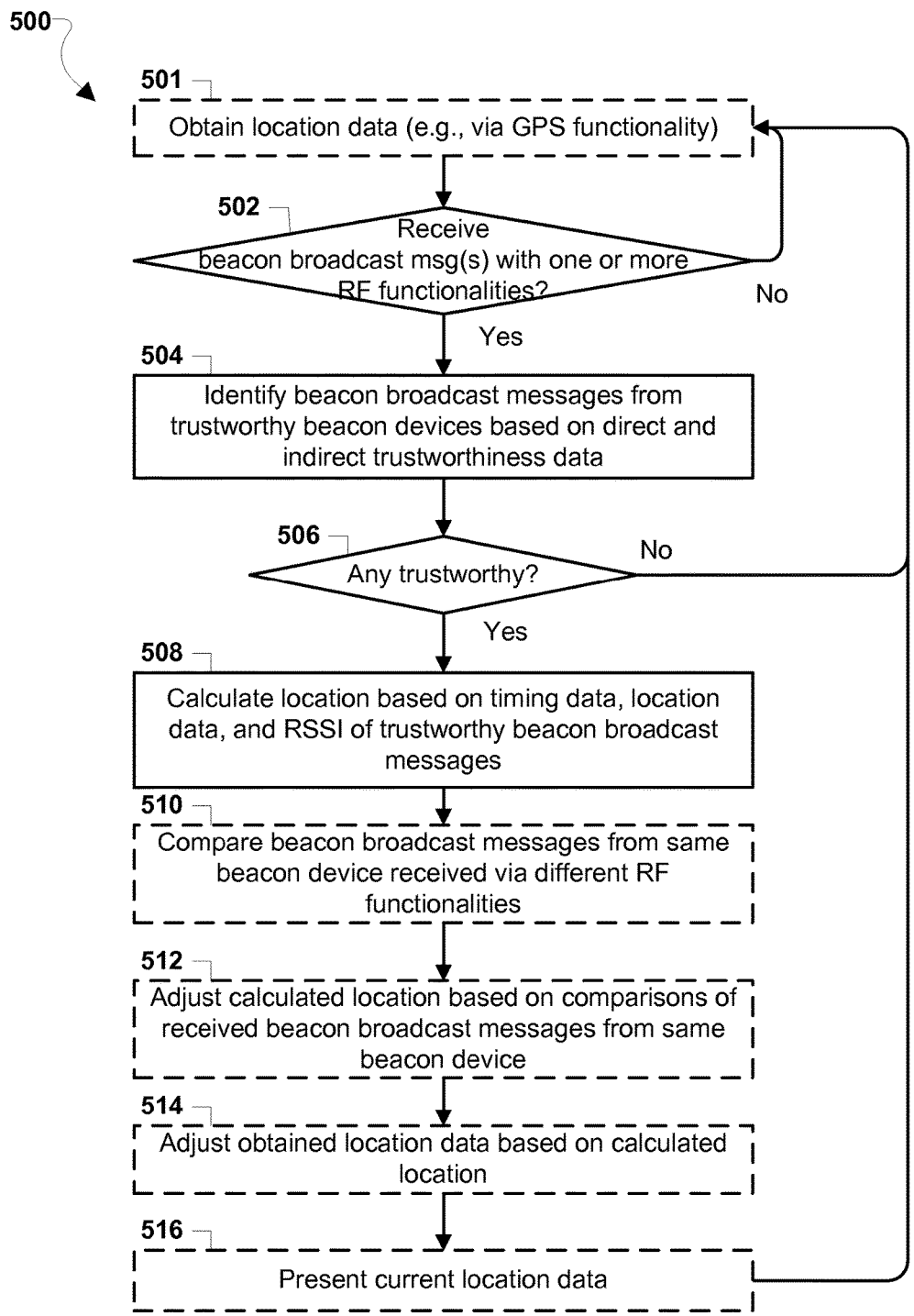
FIG. 5 is a diagram of a method for a receiver device to receive and process broadcast messages that include location data and neighbor beacon device data according to various embodiments.

FIG. 5 illustrates a method 500 for a receiver device, such as a UAV or a smartphone mobile computing device, to receive and process wireless broadcast messages from beacon devices within transmission range according to various embodiments. With reference to FIGS. 1-5, as a receiver device (e.g., UAV 130) comes within the transmission range of beacon devices (e.g., beacon device 102a), the receiver device may evaluate both the authentication data of received broadcast messages to determine trustworthiness of the included location data, as well as any neighbor beacon device information included within the received broadcast messages. The operations of the method 500 may be performed by a processor of various receiver devices, such as a processor of a UAV. In some embodiments, beacon devices may also be configured to perform the operations of the method 500. For example, a beacon device may perform operations of the method 500 when configured to operate in a receiving-only mode or as a replacement for the operations in blocks 402, 410-418, and 424-426 of the method 400.

In optional block 501, the processor of the receiver device may obtain location data, such as via a GPS functionality. The operations of optional block 501 may be similar to those of block 402 in the method 400, except that the operations in optional block 501 may not necessarily include obtaining location data from user inputs and/or other devices. For example, the receiver device may be an aerial UAV configured to periodically receive GPS signals via a GPS receiver. The operations in optional block 501 may be optional when the receiver device is unable to acquire GPS signals from overhead satellites, such as due to being out of coverage, in a building, and/or having malfunctioning or inoperable GPS functionalities.

In determination block 502, the processor of the receiver device may determine whether any beacon broadcast messages have been received via one or more RF functionalities. For example, the receiver device may evaluate an incoming buffer for messages associated with various wireless messaging protocols, mediums, frequencies, formats, transceivers, and/or standards to determine whether any beacon broadcast messages have been received over a monitoring period. The operations in determination block 502 may be similar to the operations in determination block 410 as described.

In response to determining that no beacon broadcast messages have been received via the one or more RF functionalities (i.e., determination block 502="No"), the receiver device may continue with the obtaining operations in optional block 501.

In response to determining that beacon broadcast messages have been received via the one or more RF functionalities (i.e., determination block 502="Yes"), the processor of the receiver device may identify received beacon broadcast messages from trustworthy beacon devices based on direct trustworthiness data (e.g., data from an authentication data segment 310) and indirect trustworthiness data (e.g., data from neighbor data segments 312) in block 504. For example, the receiver device may directly evaluate trustworthiness of the beacon devices associated with the received beacon broadcast messages based on the authentication data included in the received beacon broadcast messages. Such operations may be similar to those described above with reference to blocks 416-418 in the method 400. As another example, the receiver device may also use the "indirect" trustworthiness data segments of neighbor data segments to identify whether neighbor beacon devices to the beacon device that sent the received beacon broadcast messages are trustworthy.

In some embodiments, the receiver device may be configured to weigh other calculations as to the level of trust for particular beacon devices using stored data, such as data from a database or message log. For example, the receiver device may calculate a level of trust or probability of trust for each received beacon broadcast message in order to determine trustworthiness. In some embodiments, the receiver device may be configured to perform operations similar to as described above with reference to 410-418 in the method 400 in order to process received beacon broadcast messages from beacon devices in a similar manner as a beacon device may evaluate messages from neighbor beacon devices.

In determination block 506, the processor of the receiver device may determine whether any of the received beacon broadcast messages include trustworthy data based on the operations of block 504. For example, the receiver device may determine whether the level of trust for each received beacon broadcast message exceeds a minimum threshold value for trust. In response to determining that none of the received beacon broadcast messages (or the respective sender beacon devices) are trustworthy (i.e., determination block 506="No"), the receiver device may continue with the optional obtaining operations in optional block 501.

In response to determining that one or more of the received beacon broadcast messages are trustworthy (i.e., determination block 506="Yes"), the processor of the receiver device may determine a location of the receiver device by performing calculations using information from the received, trustworthy beacon broadcast messages in block 508. For example, the receiver device may perform trilateration calculations based on the timing and location data from the trustworthy beacon broadcast messages in order to calculate geographic coordinates of the receiver device. In some embodiments, the receiver device may also use RSSI information (or signal strength assessments) along with the location data and timing data of the trustworthy beacon broadcast messages to determine the location of the receiver device.

In optional block 510, the processor of the receiver device may compare beacon broadcast messages from the same beacon device received via different RF functionalities. The receiver device may compare the timing between two or more different beacon broadcast messages received from the same trusted beacon device to identify any variance that may determine whether there are particular environmental conditions that may affect the calculation of the location. For example, based on slight differences in the signal strengths or other characteristics (e.g., flight times) for two received beacon broadcast messages (e.g., RF messages) at different frequencies from a certain beacon device, the receiver device may determine that the receiver device may be located behind a structure that may cause the differences in the received beacon broadcast messages.

In optional block 512, the processor of the receiver device may adjust the calculated location based on the comparisons of beacon broadcast messages from the same beacon device. In optional block 514, the processor of the receiver device may adjust the obtained location data based on the determined (i.e., calculated) location. For example, the determined location of the receiver device may be used to refine or otherwise adjust any previously obtained location data. In optional block 516, the processor of the receiver device may present the location data (e.g., determined based on received beacon broadcast messages, obtained via a GPS receiver, etc.), such as rendering the location data on a screen of the receiver device or transmitting a report to another device (e.g., a server, a user's mobile device, etc.). The receiver device may continue with the obtaining operations in optional block 501.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the method 400 may be substituted for or combined with one or more operations of the method 500.

Figure 6:
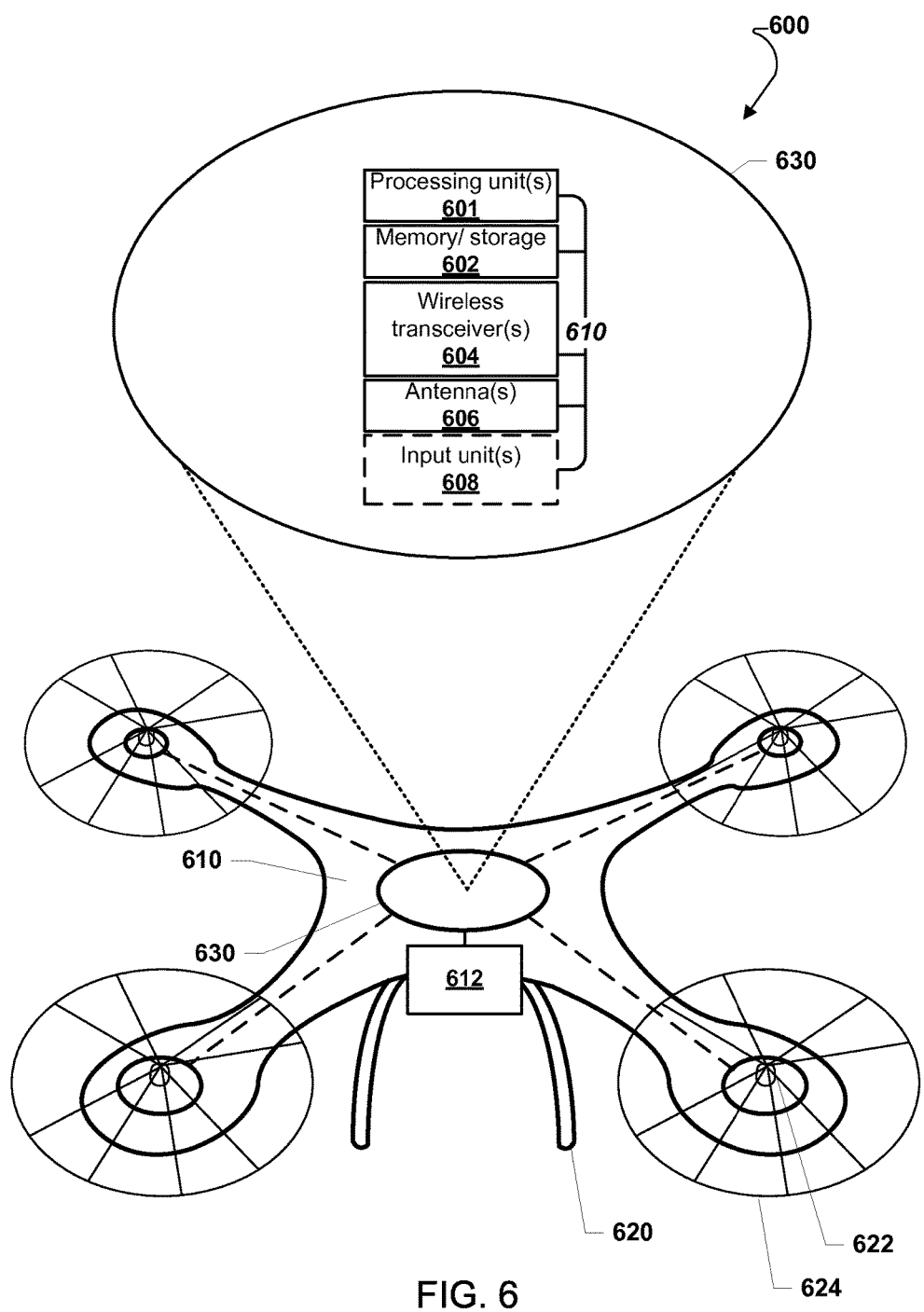
FIG. 6 is a component block diagram of an unmanned aerial vehicle suitable for use with various embodiments.

Various embodiments may be suitable for use with various receiver devices, such as an autonomous aircraft or a smartphone mobile device. FIG. 6 illustrates an exemplary four-rotor aerial UAV 600 (which may, for example, correspond to the aerial UAV 130) that is suitable for use with various embodiments described with reference to FIGS. 1, 3 and 5. With reference to FIGS. 1, 3, 5, and 6, the aerial UAV 600 may include a body 610 (i.e., fuselage, frame, etc.) that may be made out of any combination of plastic, metal, or other materials suitable for flight. The body 610 may include a processor 630 that is configured to monitor and control various functionalities, subsystems, and/or other components of the aerial UAV 600. For example, the processor 630 may be configured to monitor and control various functionalities of the aerial UAV 600, such as any combination of modules, software, instructions, circuitry, hardware, etc. related to propulsion, navigation, power management, sensor management, and/or stability management.

The processor 630 may include one or more processing unit(s) 601, such as one or more processors configured to execute processor-executable instructions (e.g., applications, routines, scripts, instruction sets, etc.), and a memory and/or storage unit 602 configured to store data (e.g., flight plans, obtained sensor data, received messages, applications, etc.). The processor 630 may also include (or be coupled to) one or more wireless transceiver(s) 604 and antenna(s) 606 for transmitting and receiving wireless signals (e.g., a Wi-Fi® radio and antenna, Bluetooth®, RF, etc.). In some embodiments, the aerial UAV 600 may also include components for communicating via various wide area networks, such as cellular network transceivers or chips and associated antenna (not shown). In some embodiments, the processor 630 of the aerial UAV 600 may further include various input units 608 for receiving data from human operators and/or for collecting data indicating various conditions relevant to the aerial UAV 600. For example, the input units 608 may include camera(s), microphone(s), location data functionalities (e.g., a global positioning system (GPS) receiver/antenna for receiving GPS signals), flight instruments (e.g., attitude indicator(s), gyroscope(s), accelerometer(s), altimeter(s), compass(es), etc.), keypad(s), etc. Various components of the processor 630 may be connected via a bus 610 or other similar circuitry.

The body 610 may include landing gear 620 of various designs and purposes, such as legs, skis, wheels, pontoons, etc. The body 610 may include a power source 612 that may be coupled to and configured to power various other components of the aerial UAV 600. For example, the power source 612 may be a rechargeable battery for providing power to operate the motors 622 and/or the units of the processor 630.

The aerial UAV 600 may be of a helicopter design that utilizes one or more rotors 624 driven by corresponding motors 622 to provide lift-off (or take-off) as well as other aerial movements (e.g., forward progression, ascension, descending, lateral movements, tilting, rotating, etc.). The aerial UAV 600 may utilize various motors 622 and corresponding rotors 624 for lifting off and providing aerial propulsion. For example, the aerial UAV 600 may be a "quad-copter" that is equipped with four motors 622 and corresponding rotors 624. The motors 622 may be coupled to the processor 630 and thus may be configured to receive operating instructions or signals from the processor 630. For example, the motors 622 may be configured to increase rotation speed of their corresponding rotors 624, etc. based on instructions received from the processor 630. In some embodiments, the motors 622 may be independently controlled by the processor 630 such that some rotors 624 may be engaged at different speeds, using different amounts of power, and/or providing different levels of output for moving the UAV 130. For example, motors 622 on one side of the body 600 may be configured to cause corresponding rotors 624 to spin at a higher rotations per minute (RPM) than rotors 624 on the opposite side of the body 600 in order to balance the aerial UAV 600.

Various processors described herein may be any programmable microprocessor, microcomputer or multiple processor chip or chips that can be configured by software instructions (applications) to perform a variety of functions, including the functions of various embodiments described herein. In various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into various devices and memory within the processors.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The operations of a method or algorithm disclosed herein may be embodied in a processor-executable software module or processor-executable software instructions, which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray Disc® where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for a beacon device within a system of beacon devices to provide location data for use by nearby receiver devices, comprising:
   obtaining, via a processor of the beacon device, location data using a first functionality;
   evaluating, via the processor, sensor data from one or more environmental sensors of the beacon device to identify breach of trust conditions at the beacon device;
   determining, via the processor, whether any of the identified breach of trust conditions may be corrected by the beacon device;
   correcting, via the processor, the determined correctable breach of trust conditions;
   generating, via the processor, authentication data indicating any uncorrected identified breach of trust conditions;
   receiving, via the processor, one or more neighbor beacon broadcast messages using a second functionality;
   calculating, via the processor, a level of trust for one or more neighbor beacon devices based on at least two factors encoded within authentication data of the neighbor beacon broadcast message from each neighbor beacon device;
   determining, via the processor, whether the one or more neighbor beacon broadcast messages include trustworthy location data based on the calculated level of trust; and
   broadcasting an outgoing message that includes the obtained location data, timing data, the generated authentication data, and data indicating whether the one or more neighbor beacon broadcast messages include the trustworthy location data based on the calculated level of trust for the one or more neighbor beacon devices.

2. The method of claim 1, wherein obtaining, via the processor of the beacon device, location data using the first functionality comprises:
   receiving the location data from one or more of user inputs, a global positioning system (OPS) receiver based on received GPS signals, and incoming messages from neighbor beacon devices.

3. The method of claim 1, wherein evaluating, via the processor, sensor data to identify the breach of trust conditions at the beacon device comprises:
   evaluating, via the processor, the sensor data to detect a movement of the beacon device, wherein the sensor data is obtained from one or more of a camera sensor, an accelerometer sensor, a gyroscope sensor, and a tamper sensor.

4. The method of claim 1, wherein the sensor data is obtained by the beacon device from at least one sensor coupled to the beacon device.

5. The method of claim 1, wherein the generated authentication data comprises one or more of tamper state information, a hash, and encrypted data.

6. The method of claim 1, wherein obtaining the location data using the first functionality comprises obtaining the location data using at least one of a GPS receiver, a cellular network connection, and a user input.

7. The method of claim 1, wherein determining, via the processor, whether the one or more neighbor beacon broadcast messages include trustworthy location data comprises:

determining, via the processor, whether the one or more neighbor beacon broadcast messages include data indicating whether corresponding neighbor beacon devices experienced a breach of trust condition.

8. The method of claim 7, wherein the breach of trust condition comprises the corresponding neighbor beacon devices being moved, damaged, or hacked.

9. The method of claim 1, further comprising:
updating, via the processor, an incoming message log based on the one or more neighbor beacon broadcast messages,
wherein determining, via the processor, whether the one or more neighbor beacon broadcast messages include trustworthy location data comprises:
determining, via the processor, whether the one or more neighbor beacon broadcast messages include trustworthy location data based at least on information within the incoming message log.

10. The method of claim 1, wherein determining, via the processor, whether the one or more neighbor beacon broadcast messages include trustworthy location data comprises:
determining, via the processor, whether the calculated level of trust for each neighbor beacon device that broadcasted the one or more neighbor beacon broadcast messages exceeds a threshold.

11. The method of claim 1, further comprising:
appending, via the processor, to the outgoing message a neighbor beacon device identifier and a data segment indicating trustworthiness for each neighbor beacon device that broadcasted the one or more neighbor beacon broadcast messages.

12. The method of claim 1, further comprising:
adjusting, via the processor, the obtained location data based any of the one or more neighbor beacon broadcast messages that are determined to include trustworthy location data.

13. A beacon device, comprising:
a memory; and
a processor coupled to the memory and configured with processor-executable instructions to:
obtain location data using a first functionality;
evaluate sensor data from one or more environmental sensors of the beacon device to identify breach of trust conditions at the beacon device;
determining whether any of the identified breach of trust conditions may be corrected by the beacon device;
correcting the determined correctable breach of trust conditions;
generate authentication data indicating any uncorrected identified breach of trust conditions;
receive one or more neighbor beacon broadcast messages using a second functionality;
calculate a level of trust for one or more neighbor beacon devices based on at least two factors encoded within authentication data of the neighbor broadcast message from each neighbor beacon device;
determine whether the one or more neighbor beacon broadcast messages include trustworthy location data based on the calculated level of trust; and
broadcast an outgoing message that includes the obtained location data, timing data, the generated authentication data, and data indicating whether the one or more neighbor beacon broadcast messages include the trustworthy location data based on the calculated level of trust for the one or more neighbor beacon devices.

14. The beacon device of claim 13, wherein the processor is further configured with processor-executable instructions to obtain the location data using the first functionality by receiving the location data from one or more of user inputs, a global positioning system (GPS) receiver based on received GPS signals, and incoming messages from neighbor beacon devices.

15. The beacon device of claim 13, wherein the processor is further configured with processor-executable instructions to evaluate the sensor data to identify the breach of trust conditions at the beacon device by evaluating the sensor data to detect a movement of the beacon device, wherein the sensor data is obtained from one or more of a camera sensor, an accelerometer sensor, a gyroscope sensor, and a tamper sensor.

16. The beacon device of claim 13, wherein the generated authentication data comprises one or more of tamper state information, a hash, and encrypted data.

17. The beacon device of claim 13, wherein the processor is further configured with processor-executable instructions to determine whether the one or more neighbor beacon broadcast messages include trustworthy location data by determining whether the one or more neighbor beacon broadcast messages include data indicating whether corresponding neighbor beacon devices experienced a breach of trust condition.

18. The beacon device of claim 13, wherein the processor is further configured with processor-executable instructions to:
update an incoming message log based on the one or more neighbor beacon broadcast messages; and
determine whether the one or more neighbor beacon broadcast messages include trustworthy location data by determining whether the one or more neighbor beacon broadcast messages include trustworthy location data based at least on information within the incoming message log.

19. The beacon device of claim 13, wherein the processor is further configured with processor-executable instructions to determine whether the one or more neighbor beacon broadcast messages include trustworthy location data by:
determining whether the calculated level of trust for each neighbor beacon device that broadcasted the one or more neighbor beacon broadcast messages exceeds a threshold.

20. The beacon device of claim 13, wherein the processor is further configured with processor-executable instructions to append to the outgoing message a neighbor beacon device identifier and a data segment indicating trustworthiness for each neighbor beacon device that broadcasted the one or more neighbor beacon broadcast messages.

21. A method for a receiver device to use data from a system of beacon devices, comprising:
initiating an attempt to obtain location data using a first functionality of the receiver device;
receiving a plurality of broadcast messages from beacon devices;
determining, via a processor of the receiver device, whether each of the received plurality of broadcast messages include trustworthy location data by:
calculating a level of trust for each of the received plurality of broadcast messages based on at least two factors encoded within authentication data of the neighbor beacon broadcast message from each neighbor beacon device; and determining whether the calculated level of trust for each of the received plurality of broadcast messages exceeds a threshold;

determining, via the processor, a location of the receiver device based on timing data, the trustworthy location data, and received signal strength indication (RSSI) information associated with the received plurality of broadcast messages that are determined to include the trustworthy location data;

comparing, via the processor, at least two broadcast messages from the received plurality of broadcast messages that are from a first beacon device and were received via a second functionality, and adjusting, via the processor, the determined location based on the comparison of the at least two broadcast messages from the received plurality of broadcast messages that are from the first beacon device.

22. The method of claim 21, wherein the receiver device is an unmanned autonomous vehicle (UAV).

23. The method of claim 21, further comprising:

obtaining, via the processor, the location data using a positioning system different from the beacon devices; and adjusting, via the processor, the location data based on the determined location.

24. A receiver device, comprising:

a memory; and a processor coupled to the memory and configured with processor-executable instructions to:

initiate an attempt to obtain location data using a first functionality of the receiver device;

receive a plurality of broadcast messages from beacon devices a plurality of broadcast messages from beacon devices;

determine whether each of the received plurality of broadcast messages include trustworthy location data from additional processor-executable instructions to:

calculate a level of trust for each of the received plurality of broadcast messages based on at least two factors encoded within authentication data of the neighbor beacon broadcast message from each neighbor beacon device; and determine whether the calculated level of trust for each of the received plurality of broadcast messages exceeds a threshold;

determine a location based on timing data, the trustworthy location data, and received signal strength indication (RSSI) information associated with the received plurality of broadcast messages that are determined to include the trustworthy location data;

compare, via the processor, at least two broadcast messages from the received plurality of broadcast messages that are from a first beacon device and were received via a second functionality, adjust, via the processor, the determined location based on the comparison of the at least two broadcast messages from the received plurality of broadcast messages that are from the first beacon device.

25. The receiver device of claim 24, wherein the receiver device is an unmanned autonomous vehicle (UAV).

26. The receiver device of claim 24, wherein the processor is further configured with processor-executable instructions to:

obtain the location data using a positioning system different from the beacon devices; and adjust the obtained location data based on the determined location.

* * * * *